United States Patent [19]

Rahgozar

[11] Patent Number: 5,485,566
[45] Date of Patent: Jan. 16, 1996

US005485566A

[54] METHOD OF FINDING COLUMNS IN TABULAR DOCUMENTS

[75] Inventor: M. Armon Rahgozar, Penfield, N.Y.

[73] Assignee: Xerox Corporation, Stamford, Conn.

[21] Appl. No.: 143,097

[22] Filed: Oct. 29, 1993

[51] Int. Cl.$^6$ .................................................. G06F 17/25
[52] U.S. Cl. ...................... 395/148; 364/419.17; 382/175; 382/176
[58] Field of Search ..................................... 395/146–148; 382/9, 27, 41, 48, 61, 171, 175, 176, 177; 364/419.17, 419.03–419.06

[56] References Cited

U.S. PATENT DOCUMENTS

| | | | |
|---|---|---|---|
| 4,484,826 | 11/1984 | Horn et al. | 400/279 |
| 4,575,813 | 3/1986 | Bartlett et al. | 395/147 |
| 5,321,770 | 11/1991 | Huttenlocher et al. | 382/22 |
| 5,325,444 | 10/1993 | Cass et al. | 382/9 |
| 5,355,420 | 10/1992 | Bloomberg | 382/46 |

*Primary Examiner*—Heather R. Herndon
*Assistant Examiner*—Paul A. Roberts
*Attorney, Agent, or Firm*—Oliff & Berridge

[57] ABSTRACT

Tabular documents have column structures that can be determined without decoding the bitmap. The method searches for separation intervals that separate word fragments in the table. These separation intervals are processed by intersecting them with other intervals and ranking the resulting intervals. A structured closure of separation intervals are maintained in bins. The intervals in the bins are sorted and used to determine new intersections when the next separation interval is processed. The intervals with the highest ranking are selected as the column separation intervals. The columns are easily identified with the method without first decoding the bitmap.

34 Claims, 10 Drawing Sheets

| NO | DATE | TIME | PLACE CALLED | | AREA | NUMBER | MIN | AMOUNT |
|---|---|---|---|---|---|---|---|---|
| 1 | JAN 7 | 914PM | CLEMONS | KS | 864 | 711 0693 | 7 | 23.38 |
| 2 | JAN 9 | 225PM | SUNNYLAND | KS | 043 | 335 6943 | 106 | 4.96 |
| 3 | JAN12 | 1237AM | GREECE | WV | 516 | 756 5940 | 64 | 17.02 |
| 4 | JAN19 | 345PM | ALGERIA | | 00047545191 | | 50 | 20.48 |
| 5 | JAN26 | 1154AM | BELLONA | NJ | 609 | 341 2362 | 9 | 18.99 |
| 6 | FEB 2 | 436AM | NIAG FALLS | GA | 139 | 959 6661 | 32 | 19.24 |
| 7 | FEB 7 | 644PM | CLERMONT | MO | 190 | 319 7237 | 47 | 5.69 |
| 8 | FEB11 | 635PM | HUB | MD | 444 | 178 3713 | 65 | 26.45 |
| 9 | FEB13 | 1027PM | BARRYVILLE | MD | 215 | 054 2800 | 100 | 35.73 |
| 10 | FEB19 | 607AM | ISCHUA | MD | 013 | 289 2275 | 25 | 7.52 |
| 11 | MAR 5 | 559AM | MANORHAVEN | OH | 963 | 076 6552 | 65 | 10.50 |
| 12 | MAR10 | 114PM | HIGHLANDS | KS | 563 | 589 8844 | 51 | 22.18 |

METHOD OF FINDING COLUMNS IN TABULAR DOCUMENTS

BACKGROUND OF THE INVENTION

1. Field of the Invention

This invention relates to improvements in finding the columns in a tabular document. More particular, this invention searches for column separations and only processes the line-intervals separating the word fragments in the table.

2. Description of the Related Art

A tabular document is a systematic arrangement of logically related entities that are mapped onto a layout structure based on simple linear constraints. By controlling the placement and format of each entity, these constraints provide the visual cues that help to identify the organization of a table content, i.e., its logical structure. The primary geometrical constraint imposed on a table is a linear placement of related entities. Other constraints include alignment and use of monospaced fonts in typesetting the table.

In documents containing a large number of similar records, entities of the same logical identity are typically placed along columns of a grid structure. To determine the locations of the columns, a conventional technique histograms the bitmap and searches the histogram for peaks. This method requires processing the characters and other artifacts into a bitmap.

SUMMARY OF THE INVENTION

The invention recognizes that the column structure of these types of documents can be determined without decoding the bitmap. The invention searches for column separations by examining the line-intervals separating the word fragments in the table. This method is more reliable and computationally efficient. It produces and maintains an ordered closure of a set of line intervals (word fragments separation intervals) under the operation of the line intersection. A column separation interval, which is the intersect of many word fragment separation intervals, is easily identified by this technique.

BRIEF DESCRIPTION OF THE DRAWINGS

The invention is illustrated in the accompanying drawings, in which like reference numerals are used to denote like or similar parts, wherein.

DETAILED DESCRIPTION OF THE PREFERRED EMBODIMENT

Referring now to the drawings, the drawings are for the purpose of describing preferred embodiments of the invention and not for limiting the same. The invention provides a method for finding columns in tabular documents without decoding the characters into bitmap. After the columns are located, a pattern matcher can be used to estimate the syntax of each logical field and an OCR (optical character recognition) module can read each character in the document.

Figure 1:
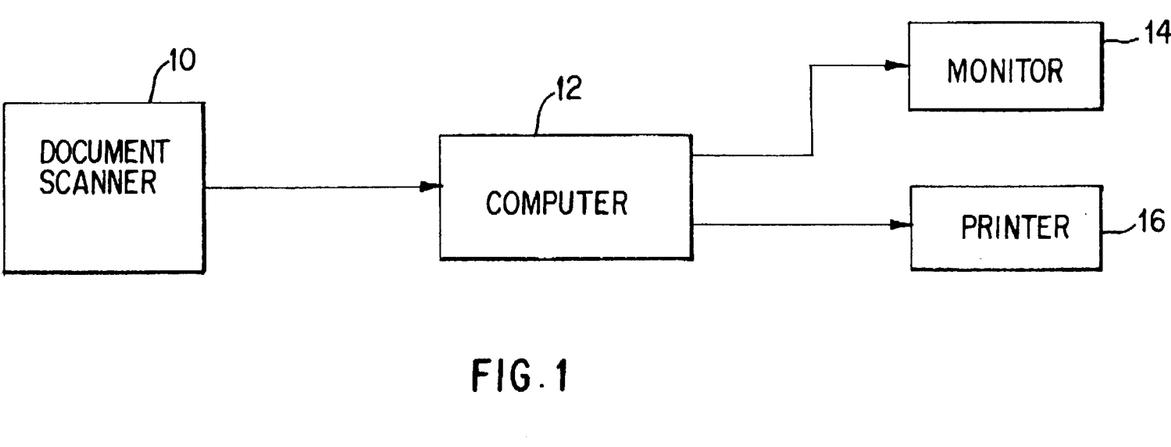
FIG. 1 is an apparatus which uses the method of the invention.

FIG. 1 shows a typical set-up that uses the method of the invention. A document scanner 10 is used to process the image. If the document is already coded, it can be input directly into the computer 12. Input may also be a PDL (Page Description Language) such as Postscript where character bounding boxes are readily available. The computer 12 locates the intervals separating the table entries by using the method of the invention. The location of the columns in the table can be displayed on the monitor 14 or printed using the printer 16. It can also be used for further processing by the computer 12, as is the case here.

Figure 2:
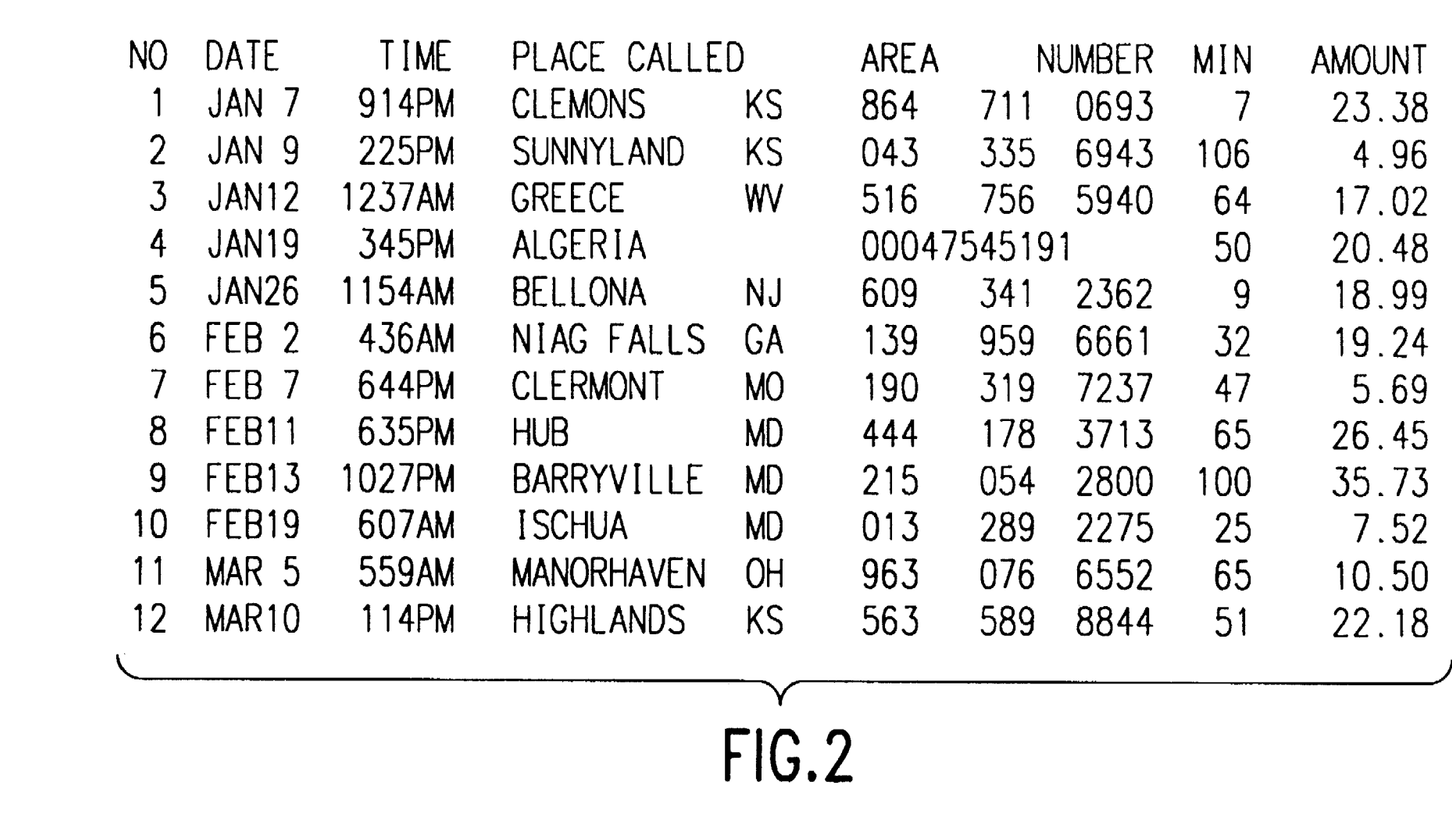
FIG. 2 is an example of a tabular document which has various column alignments.

Referring to FIG. 2, a telephone toll record is an example of the above type of document that has monospace type fonts (this is not a necessity for the method to be applicable) and exhibits various column alignments. Other examples include insurance forms, financial spreadsheets, bank statements, tax forms, and diagnostic manuals. For identifying the column structure of these documents, the visual cues are the blank spaces and/or lines that separate the columns. Ruled tables can be recognized by finding the line structures, and therefore, are not processed by the method of this invention. Ruled tables can be processed by this technique if the rules are removed. The remaining white spacing can be used to apply the algorithm.

Figure 3:
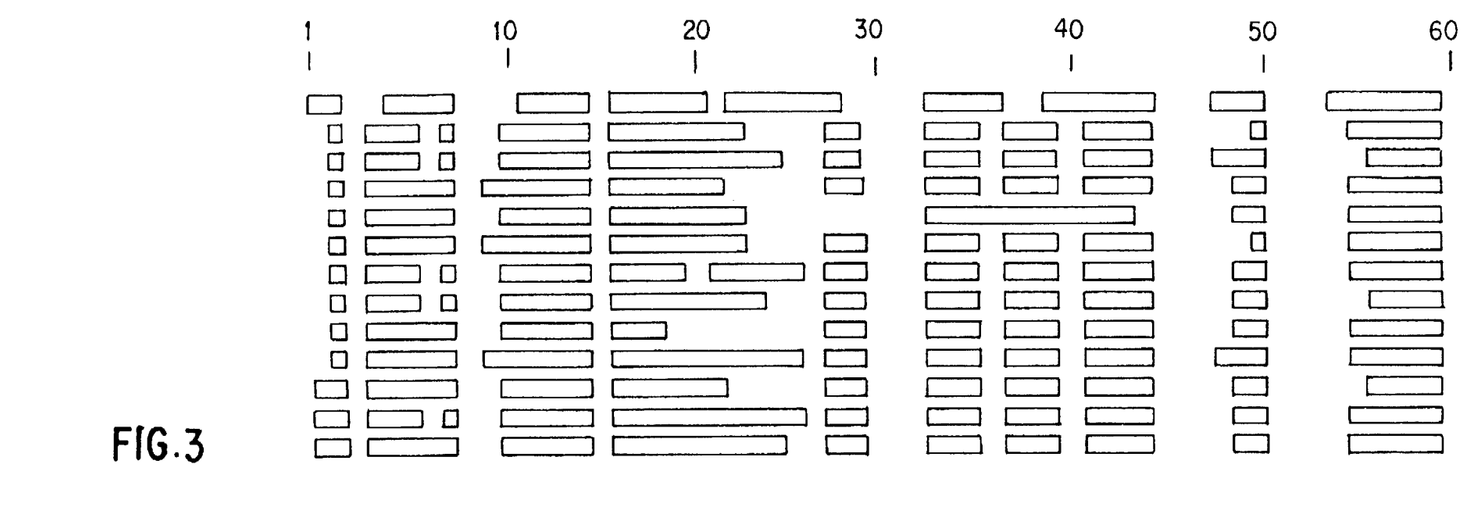
FIG. 3 is the skeleton of the tabular document of FIG. 2 represented by word fragment bounding boxes.

FIG. 3 shows a skeleton of the document in FIG. 2 where the text has been replaced with word fragment bounding boxes. A computer can extract the word fragment bounding boxes from either a bitmap or a PDL. Many of the tables layout attributes can be easily identified by concentrating on the white space that forms the borders of the columns in the table. The method finds a column structure of a table by identifying its column boundaries.

Conventionally, the column boundaries of a table can be found by projecting the image onto the horizontal axis and searching for intervals of low density along this projection. These intervals, which correspond to the column separation intervals, have a length that corresponds to the width of the column boundaries. In this invention, column separation intervals can be computed from the intervals representing the extent of the white spacing between consecutive word fragments. The method of the invention finds column separation intervals based on word fragment separation intervals. Considering that acquisition of word fragments is free in the document recognition application, this method is computationally less expensive than a method that projects and searches at the bitmap level. Furthermore, this method is more reliable for finding columns because the boundaries occupy less space and are more uniformly laid in a typical tabular document.

Figure 4:
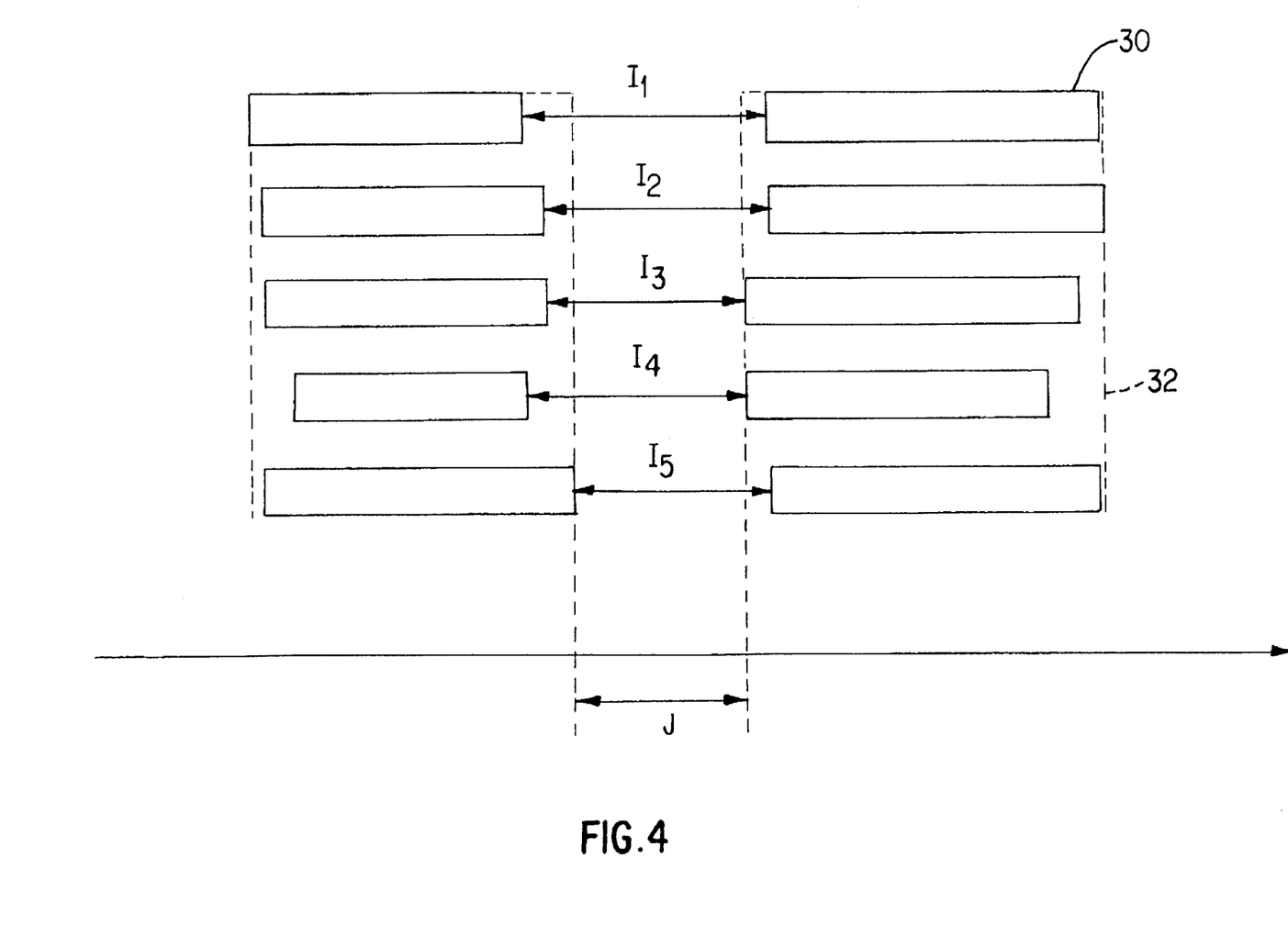
FIG. 4 is a simple table with two columns showing the word fragment separation intervals and the column separation interval.

A first preferred embodiment will be described with reference to FIGS. 4–6. Referring to FIG. 4, a word fragment bounding box is a small rectangular box which encloses a word fragment. A word fragment separation interval is defined as a large interval along the x-axis which separates two consecutive word fragment bounding boxes on the same line. FIG. 4 shows word fragment boxes 30 and the word fragment separation intervals $I_1$–$I_5$ for a simple two-column table. For example, a column bounding boxes 32 is the smallest rectangle which encloses all the entries in a column. The column separation interval is the smallest interval J along the x-axis which separates two consecutive column bounding boxes 32.

For interval J to be a column separation interval as shown in FIG. 4, it is necessary that interval J be a subset of every word fragment separation interval which separates the same line entries from two consecutive columns. Thus, interval J has to be included in their intersection. Therefore, the method finds all line intervals that can be candidates for column separation intervals by creating a closure of the set of line intervals (e.g., word fragment separation intervals) under the operation of line intersection. A set of line intervals is a closure if for any two elements in that set, their intersection is also in that set. Interval I is defined as I=[a,b]; where a<b and "a" represents the left-end point of the interval and "b" represents the right-end point of the interval. The length of the interval is $I_{length}$=(b–a). The intersection of $I_j \cap I_k$, which represents the interval of the overlap between the two intervals $I_j$ and $I_k$, may be of length zero. For each element of the closure, an associated ranking, which is the number of word fragment pairs separated by that interval, is determined. In FIG. 4, interval J has a ranking of R(J)=5. The ranking of 5 states that J can be used as a column separator for 5 rows in the table.

Thus, the method defines a process of finding column separation intervals by three tasks: first, finding the closure of the set of word fragment separation intervals; second, ranking each element of the closure based on the number of word fragment pairs that it separates; and third, searching the closure for the smallest intervals which have the highest rankings.

To find the closure G of the set of word fragment separation intervals, the closure G is iteratively updated by adding to the closure a newly found word fragment separation interval and its intersection with all the previous members of the closure. Next, each interval in the closure G is ranked. This may be accomplished by comparing every interval I of the set of word fragment separation intervals with every element g of its closure G. If g⊆I, the rank of g may be increased by one since it implies that g may be used as a separation interval instead of I. A duplicate interval increases the ranking of the interval in the closure G without adding new elements to the closure.

Alternatively, these two steps could be incorporated into a single step. For each new interval $I_{i+1}$, an intersection is determined with all elements g∈$G_i$, where $G_i$ is a closure obtained after processing the first i intervals. If g⊆$I_{i+1}$, then increment the rank of g. If $I_{i+1}$ is unique, then add $I_{i+1}$ to the closure $G_i$. Its rank can be determined by adding one to the rank of the smallest element G, that contains $I_{i+1}$. (Notice that if $I_{i+1}$ is contained in n intervals, it is also contained in their intersection. This intersection is the smallest interval in the closure that contains $I_{i+1}$, because if there was a smaller interval in the closure that had contained $I_{i+1}$, it would have been the intersection of the n intervals.) Also, if $I_{i+1}$ intersects some interval g, that intersection should be added to closure G only if it is unique. The rank of this intersection is also found by adding one to the rank of the smallest element that contains it.

At each iteration of the above method, a search is required in order to avoid adding duplicate intervals to the closure. A search is also required for ranking. The complexity of these searches increases when the size of the closure increases. In addition, every iteration goes through the entire closure. However, due to the nature of the intervals in finding columns, the intervals are typically clustered in regions. Thus, only a search of a subset of the closure may be needed.

In the invention, an unstructured closure is grouped into sets of intervals using the following scheme. Referring to FIG. 5, a hash table 40 that contains the addresses of the right-end of all the intervals is created. The hash table 40 is used in order to index into a bin structure 42. The bin structure 42 consists of many storage bins which are linked together in a sorted increasing order. Each key-value pair in the hash table 40 is associated with a storage bin in the bin structure 42. The bin holds the left-end address of all the intervals that have the same right-end address. Associated with each left-end address is an interval ranking. Each bin is also assigned a right-most address which represents the right-end address of the right-most interval that contains the address of the hash table. The left-end addresses in each bin are maintained in a right-to-left order, i.e., the smallest interval to the largest interval.

The purpose of the hash table is to provide FAST indexing into an appropriate bin storage. An array structure could replace both the hash table and the linked list. Then, the intervals with the same right end point will be stored in the array element indexed by the value of the right end point. Of course many array elements will be empty).

Figure 5:
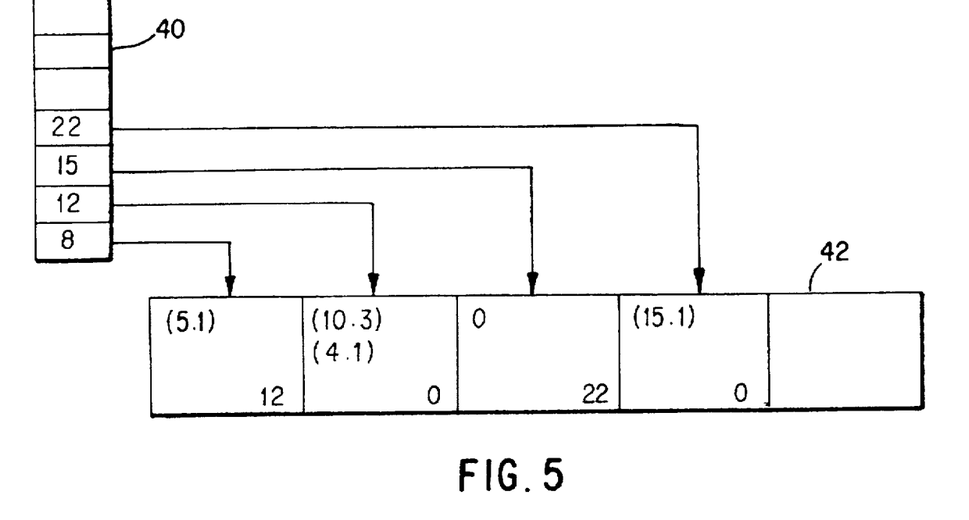
FIG. 5 is a bin structure for a simple set of line intervals.
Figure 6:
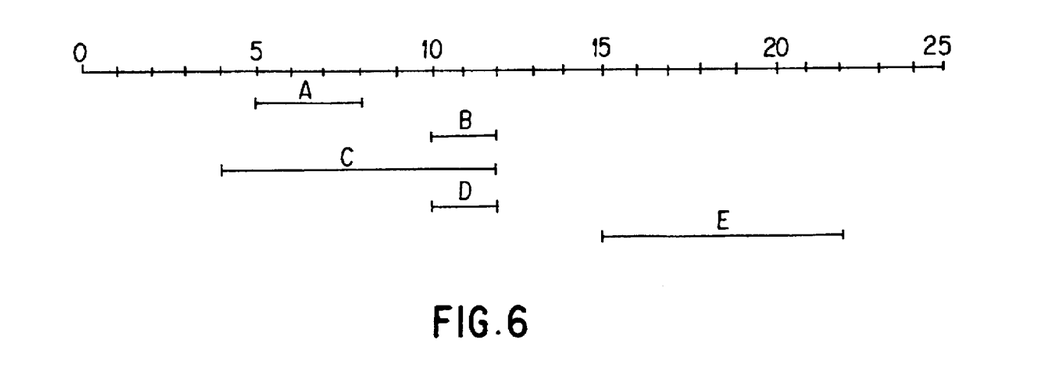
FIG. 6 is the simple set of line intervals stored in the bin structure of FIG. 5.

An example of a storage using a hash table is shown in FIG. 5 for a small set of intervals shown in FIG. 6. In FIG. 6, interval A has a right-end address of eight; intervals B and D have right-end addresses of twelve; and interval E has a right-end address of twenty-two. Therefore, the bin structure 42 must contain these three addresses as a minimum (address fifteen is shown for clarification of the example.) Referring to FIG. 5, interval A is stored in the storage bin eight with a rank of one. Interval C intersects with interval A, therefore the right-end address of the right-most interval which contains address eight is address twelve.

Address twelve in the bin structure 42 has two entries. First, interval B, which is unique, is added to the bin with rank one. This will initially be represented by (10.1) in the bin. Then, interval C, which is also unique, is added to the bin. It is represented by a new element (4.1), which has ranking of one. The intersection of intervals B and C is performed, which results in interval B. Since interval B is already in the bin, only its rank will increase. Thus, (10.1) will be changed to (10.2). Consequently, the ranking of interval B is increased by one. Next, interval D is processed. Since interval D is not unique. i.e., it replicates interval B, the rank of those intervals in the closure that contain interval D are increased. The only one that contains interval D is interval B; so its rank is increased to three. Thus, (10.2) is modified to (10.3). The right-most address of bin twelve is zero because there are no intervals with a right end to its right that contain the address twelve.

Interval E is processed. This interval does not intersect with any other intervals, therefore it is put into the storage bin twenty-two with a rank of one.

Some tabular documents may contain several columns. A second preferred embodiment of the invention eliminates the need to check each interval in the closure $G_i$. Finding the set of intervals that intersect a given interval I is performed by beginning the search at the bin containing the left-end address of interval I. This bin address includes all intervals g whose right-end addresses are greater than or equal to the left-end address of interval I:

$$\text{right}(g) \geq \text{left}(I). \quad (1)$$

This relationship of intervals g and I must exist for any interval g that intersects interval I.

The search for intersecting intervals continues by consecutively processing each bin to the right. The search could continue to the last bin; but, in the alternative, the search can cease when the last bin processed satisfies the following condition: its bin address is the same as the right-most address of the storage bin corresponding to the right-end of interval I. In other words, this bin holds the right-most interval that intersects interval I.

At each bin, the intervals that intersect interval I are found by walking down the sorted list of the left-ends in the bin, i.e. smallest to largest interval, and only considering those intervals g such that the following condition is satisfied:

$$\text{left}(g) \leq \text{right}(I) \tag{2}$$

where right(I) is the right-end address of interval I and left (g) is the left-end address of interval g.

Although all the bins may be searched in the worst case, the search length is typically proportional to the number of bins that fall in an interval. It is important to notice that during the search, a storage bin may be discarded instantly if: (1) its addresses does not correspond to any interval's right-end point, i.e. it is empty; or (2) all the elements in it are to the right of the selected interval I, i.e. the left end of the last element in the bin (the largest) is greater than the right end of interval I.

When a new interval $I_{i+1}$ intersects an interval g of the closure $G_i$, which is arranged according to the aforementioned structure, the rank of the non-empty intersection $I_g$, which was formed by the intersection $I_{i+1} \cap g$, is simply determined by adding one to the rank of the interval g. This occurs because the interval g that causes the intersection is the smallest element which contains the intersection $I_g$. This is purely a consequence of the way the intervals are stored and searched.

Figure 7A:
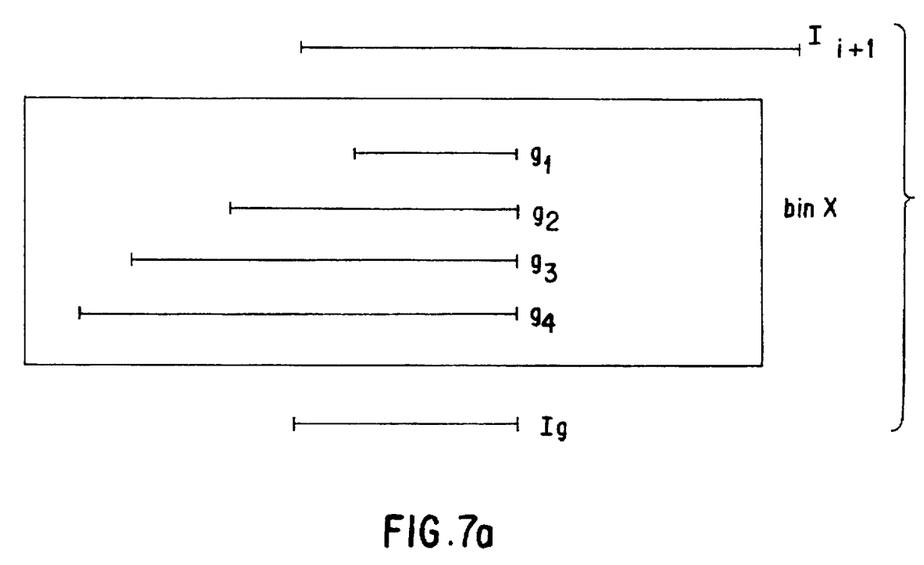
FIG. 7a–7b show an example of the intersection of an interval with intervals in a bin.

There are two possible cases that occur when a new intersection is formed. FIG. 7a shows the first case. Interval $I_{i+1}$ is intersected with the members of bin x starting from $g_1$ to $g_4$. Interval $I_g$ results from the intersection of $I_{i+1} \cap g_2$. Interval $I_g$ has the right-end of the interval $g_2$, i.e. the interval causing the intersection, and the left-end of interval $I_{i+1}$. Thus, the smallest interval containing interval $I_g$ and having the same right-end would be in the same bin as interval $I_{g2}$. Because the intervals in bin x are sorted right-to-left, i.e., left-end address of interval $g_2$ is greater than the left-end address of interval $g_3$, the smallest interval with a left-end address to the left of left-end address of interval $I_g$ is the one that produces the intersection. Furthermore, there are no intervals $I_s$ containing $I_g$ that satisfy the following two conditions:

$$\text{right}(I_s) > \text{right}(I_g) \tag{3}$$

$$\text{left}(g_3) < \text{left}(I_s) < \text{left}(I_g) \tag{4}$$

If an interval $I_s$ existed, then its intersection with the interval $g_2$ would have added another element to the bin. This can not occur because $G_i$ is a closure and must have contained it.

Figure 7B:
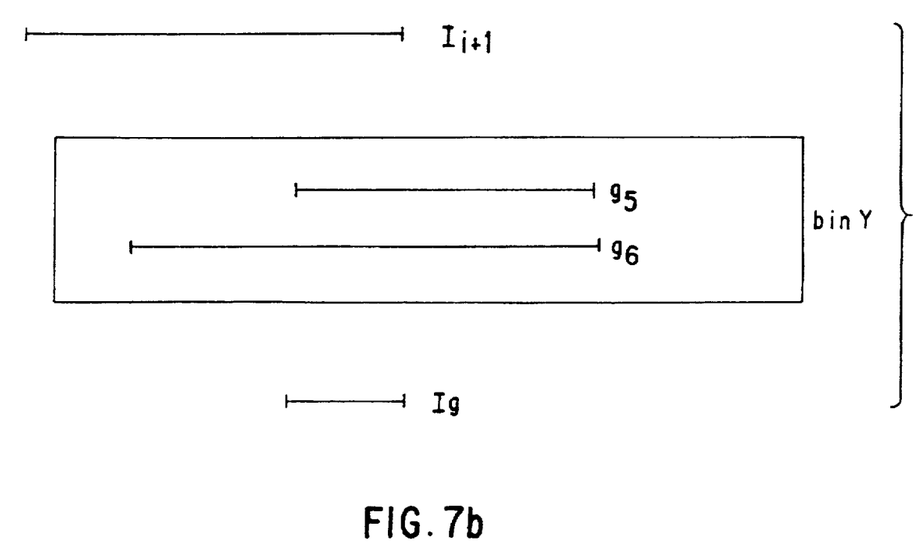

FIG. 7b shows the second case. Any interval containing $I_g$ must contain the left-end of $g_5$ and right-end of $I_{i+1}$. But no such interval $I_s$ satisfies the following conditions:

$$\text{right}(I_s) < \text{right}(g_5) \tag{5}$$

$$\text{left}(I_s) = \text{left}(g_5) \tag{6}$$

If an interval satisfied these conditions, then the interval would have caused the intersection while processing was at a previous bin. This can not occur because interval $I_g$ is a new intersection.

Figure 8:
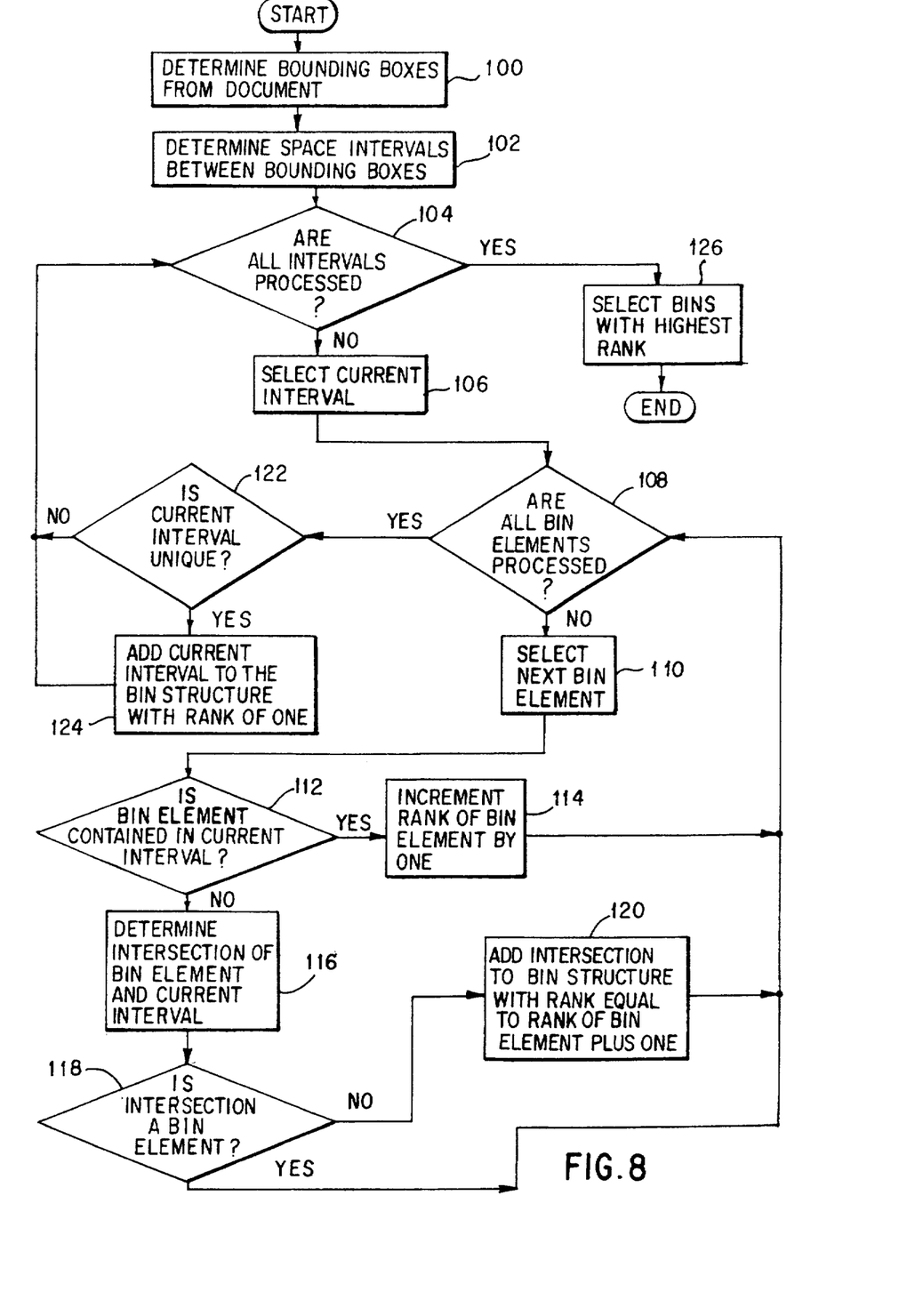
FIG. 8 is a flowchart of the method of the invention.

Referring to FIG. 8, a flow diagram of the method of the first preferred embodiment is shown. In step 100, the word bounding boxes are accessed. This can be performed by the computer program. Flow proceeds to step 102 where the space intervals between the bounding boxes is determined. These intervals are stored in memory.

In step 104, memory is checked to verify that all the intervals have been processed. If any stored interval has not been processed, the next interval (current interval) is selected from memory in step 106. Flow proceeds to step 108 to determine if all the bin elements have been processed with the current interval.

If step 108 determines that there are more bin elements to process with the current interval, then flow proceeds to step 110 to select the next bin element. Step 112 checks if the selected bin element is contained in the current interval. If the selected bin element is contained in the current interval, then the rank of the selected bin element is increased by one in step 114. Flow now returns to step 108.

If step 112 determines that the selected bin element is not contained in the current interval, then the intersection of the selected bin element and the current interval is determined in step 116. Step 118 determines if the non-empty intersection is a bin element. If the intersection is not a bin element, then the intersection is added to the bin structure and its rank is equal to the rank of the selected bin element plus one. If either the intersection is the selected bin element in step 122 or execution of step 124 is complete, flow returns to step 108.

After all the bin elements are processed in step 108, then flow proceeds to step 122 to check if the current interval is unique. If the current interval is unique, then step 124 is executed to add the current interval to the bin structure with a rank of one. If the current interval is not unique or the execution of step 124 is complete, flow proceeds to step 104 to determine if there is another interval in memory to process. After all the intervals are processed, flow proceeds to step 126 to select the bins with the highest ranks.

It is not necessary to perform steps 100 and 102 before performing step 104. In the alternative, step 104 could determine the next space interval between the next set of bounding boxes. For each iteration to fill the bin structure, the modified step would perform the function of determining if another space interval exists and locating that space interval.

Figure 9:
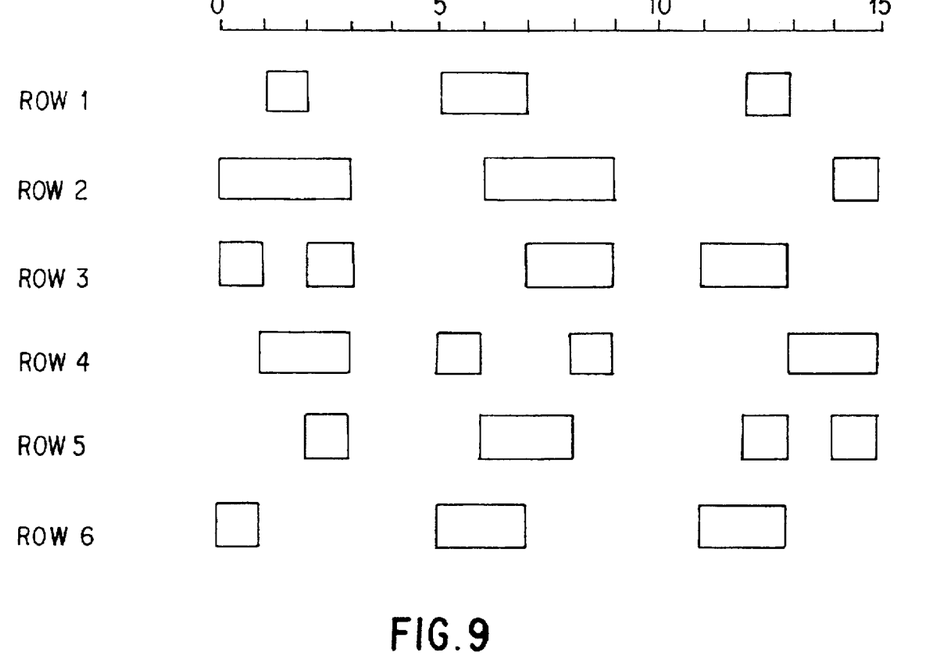
FIGS. 9–16 show an example using the method of the invention.
Figure 10:
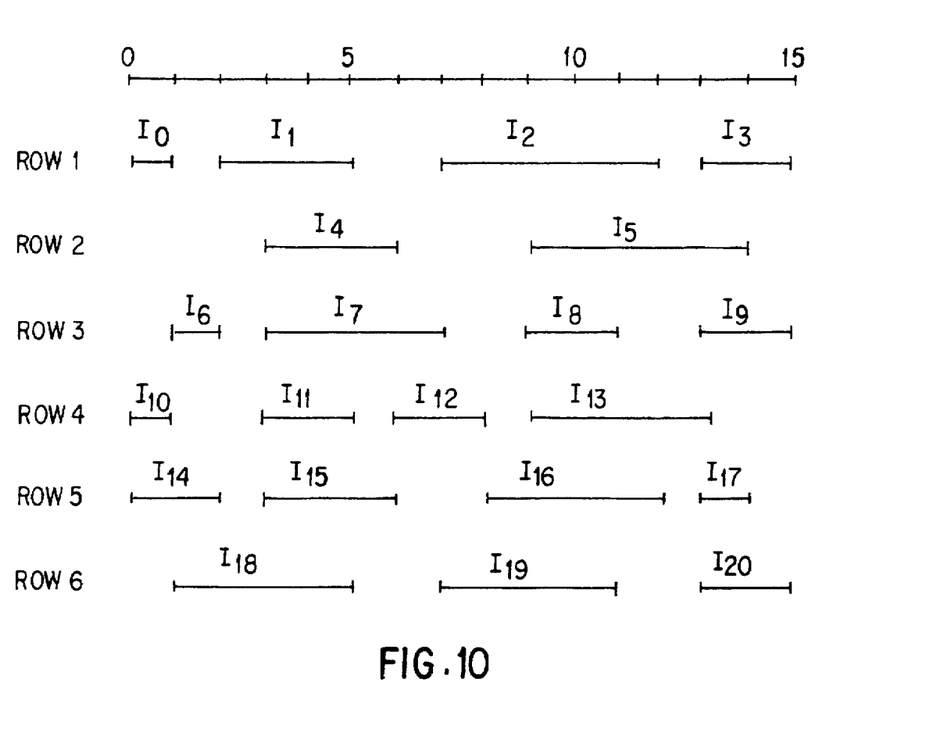

Referring to FIGS. 9–16, an example using this method will be described. FIG. 9 displays a skeleton of a document where only the word fragment bounding boxes are shown. As can be seen by this figure, there are three different columns ranging from 0 to 3, 5 to 9, and 11 to 15. There are six rows of data each having varying widths of text which are within the bounding boxes. FIG. 10 shows the six rows with the intervals between the bounding boxes marked from $I_0$ to $I_{20}$. As can be seen in the figure, row 1 has four separate intervals which do not contain text.

Figure 13:
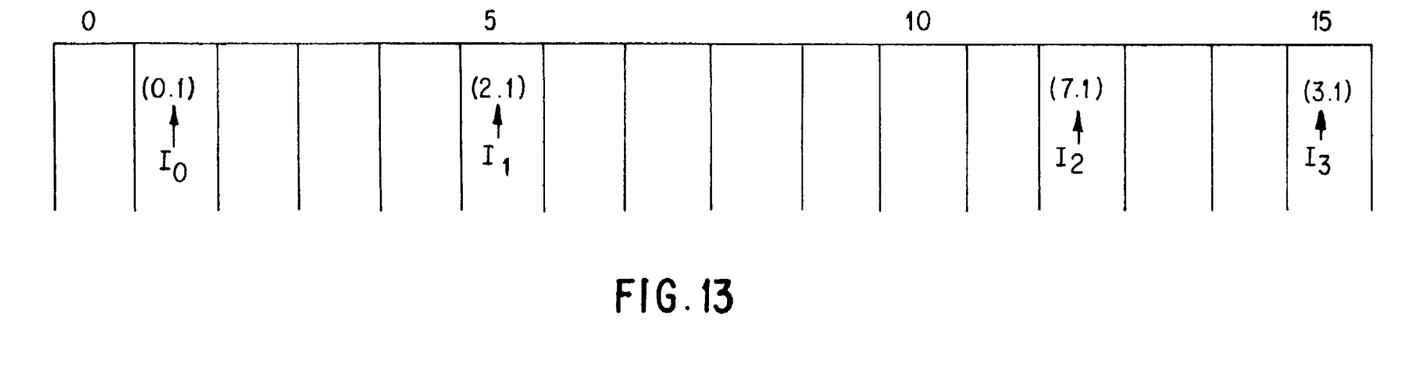

Row 1 is processed first. Referring to FIG. 13, a bin structure is created using an array with fifteen locations. In the alternative, a hash table could be used with new addresses added when necessary. Each of the four intervals is placed in the appropriate bin. The interval $I_0$ has address locations between 0 and 1. Therefore, interval $I_0$ is represented in bin 1 with the digit left of the decimal point indicating the left-end point of the interval. The number to the right of the decimal point indicates the ranking of that interval. Therefore, interval $I_0$ is located in bin 1 with the notation (0.1). Similarly, $I_1$ ranges from address location 2 to 5. Therefore, interval $I_1$ is put into bin 5 with the notation (2.1). Similarly, interval $I_2$, which has address locations from 7 to 12, is placed into bin 12 with the notation (7.1). The interval $I_3$ is placed into bin 15 with the notation (13.1). None of these intervals intersect with each other, and therefore, this row is complete.

Row 2 is next processed. Interval $I_4$ is located between 3 and 6. An intersection is determined between interval $I_4$ and all the intervals which are already in the bin structure. It is clear from FIG. 10 that interval $I_4$ is not a duplicate of any previous interval and it intersects only with interval $I_1$. The intersection of intervals $I_1$ and $I_4$ is not a bin element. Therefore, a new interval $I_{21}$ is created using the following equation:

$$I_4 \cap I_1 = [3,5] = I_{21} \tag{7}$$

Figure 14:
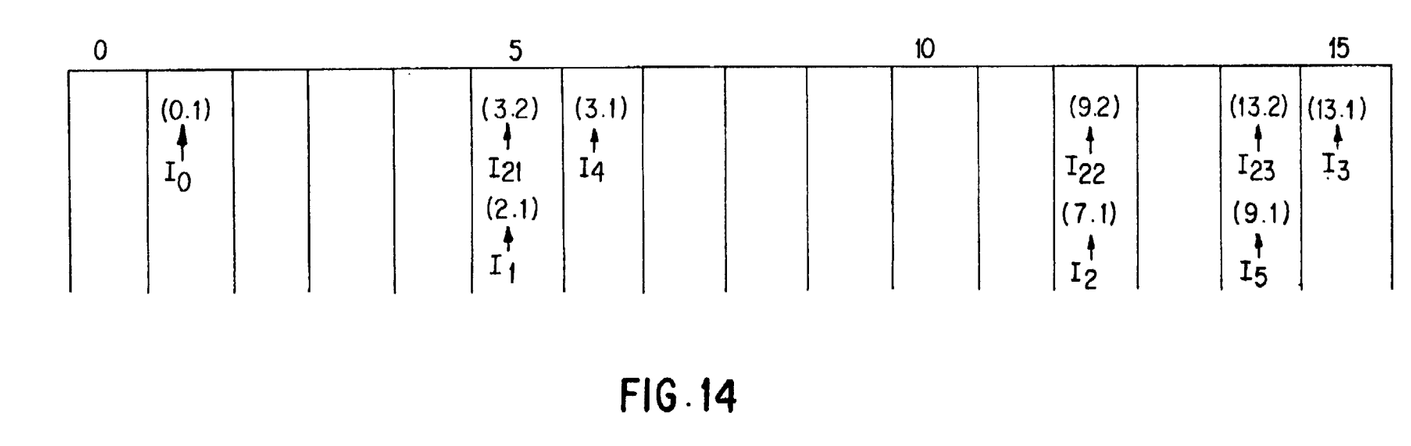

Referring to FIG. 14, bin 5 now contains the notation (3.2), which represents interval $I_{21}$. The rank of the interval is 2 because the rank is a sum of ranks of two intervals causing the intersection, i.e., intervals $I_1$ and $I_4$. Interval $I_4$ is also added to bin 6 with the notation (3.1). Bin 5 now has two elements in it with the highest rank on top.

Next, interval $I_5$ is processed. Referring to FIG. 10, interval $I_5$ intersects both intervals $I_2$ and $I_3$. These intersections create two new intervals $I_{22}$ and $I_{23}$, which are determined from the following equations:

$$I_5 \cap I_2 = [9,12] = I_{22} \tag{8}$$

$$I_5 \cap I_3 = [13,14] = I_{23} \tag{9}$$

The ranking of each interval $I_{22}$ and $I_{23}$ is determined as before so that their rank is two. Now that this row is complete, the bin structure is updated and shown in FIG. 14. As can be seen, bin 12 now contains the notation (9.2) for new interval $I_{22}$ and new interval $I_{23}$ is located in bin 14 with the notation (13.2). Interval $I_5$ is also added to bin 14 with rank one and is represented by the notation (9.1).

Figure 11:
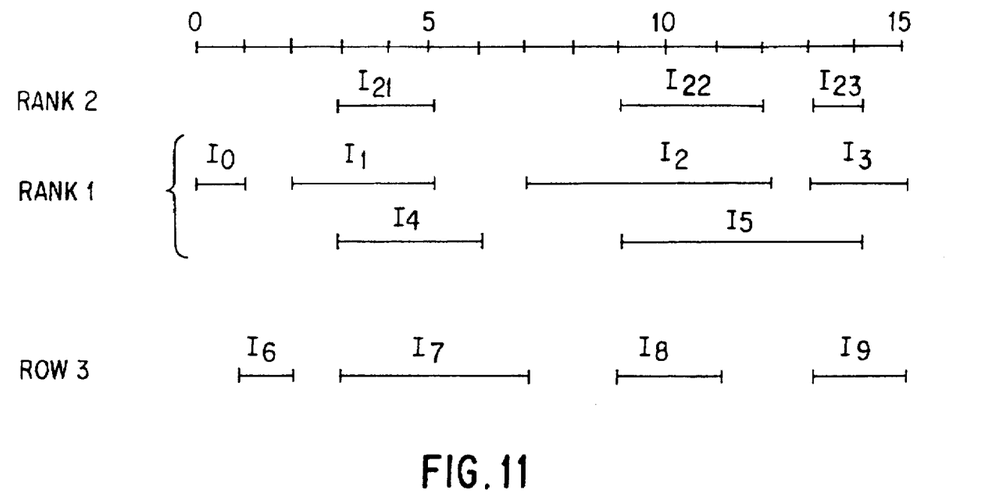
Figure 12:
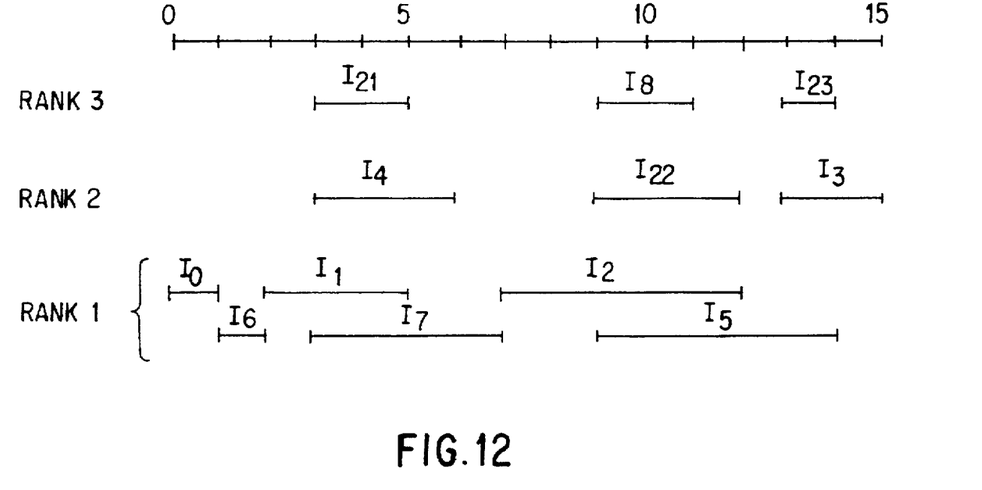

Referring to FIG. 11, the intervals in the bins are drawn. Rank 2 intervals are $I_{21}$, $I_{22}$ and $I_{23}$ and rank 1 intervals are $I_1$–$I_5$. Also, row 3 has been drawn with intervals $I_6$–$I_9$.

Figure 15:
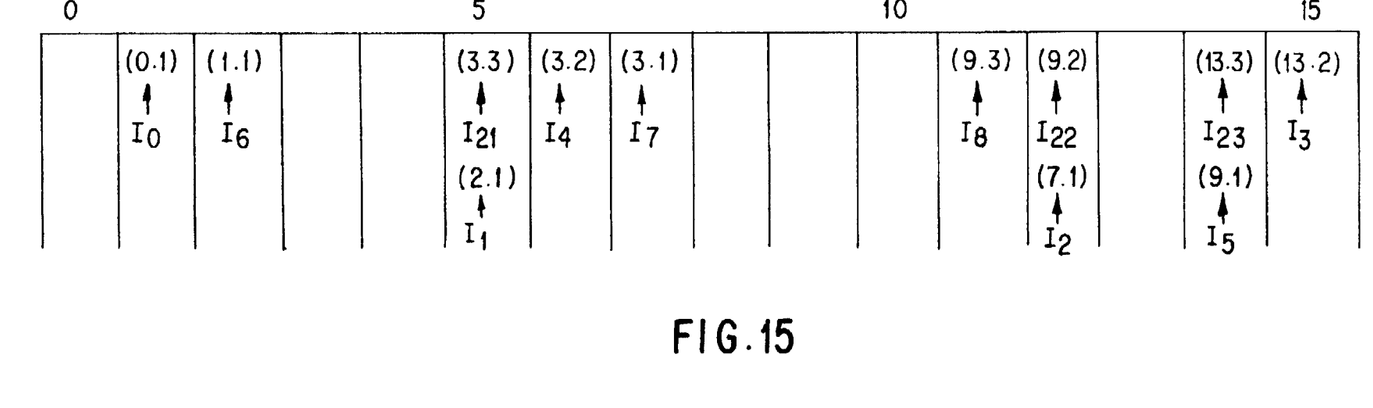

As can be seen by FIG. 11, interval $I_6$ does not intersect with any other intervals. Therefore, it is added to bin 2 as shown in FIG. 15.

Interval $I_7$ intersects with three intervals: $I_{21}$, $I_1$ and $I_4$. The intersection of each of these intervals with interval $I_7$ is determined by the following equations:

$$I_7 \cap I_4 = [3,6] = I_4 \tag{10}$$

$$I_7 \cap I_{21} = [3,5] = I_{21} \tag{11}$$

$$I_7 \cap I_1 = [3,5] = I_{21} \tag{12}$$

The intersection of equation 10 is simply interval $I_4$. Thus interval $I_4$ is contained in interval $I_7$. Therefore, no new interval is added to the bin structure, but the ranking of interval $I_4$ is increased by one. Referring to FIG. 15, interval $I_4$, which is located in bin 6, has the updated notation (3.2). Accordingly, Equation 11 does not add a new element to the bin structure, but increases the rank of interval $I_{21}$ to three. Intersection of intervals $I_7$ and $I_1$ is interval $I_{21}$ which is already in the bin structure, so nothing is done. Interval $I_7$ is added to bin 7 with a rank of one.

Referring to FIG. 11, interval $I_8$ intersects intervals $I_{22}$, $I_2$ and $I_5$. These intersections generate the following intervals:

$$I_8 \cap I_{22} = [9,11] = I_8 \tag{13}$$

$$I_8 \cap I_2 = [9,11] = I_8 \tag{14}$$

$$I_8 \cap I_5 = [9,11] = I_8 \tag{15}$$

The first intersection, equation 13, adds interval $I_8$ to the bin structure with a rank of three because one is added to the rank of interval $I_{22}$, which is two. The intersections in equations 14 and 15 will not have any effects since interval $I_8$ has already been added to the bin structure.

Referring to FIG. 11, interval $I_9$ intersects with intervals $I_{23}$, $I_3$ and $I_5$. The following equations are determined by these intersection:

$$I_9 \cap I_{23} = [13,14] = I_{23} \tag{16}$$

$$I_9 \cap I_3 = [13,15] = I_3 \tag{17}$$

$$I_9 \cap I_5 = [13,14] = I_{23} \tag{18}$$

The ranking of intervals $I_{23}$ and $I_3$ is increased by one since each is contained in interval $I_9$. Equation 18 has no effect since interval $I_{23}$ is already in the bin structure. FIG. 15 shows the bin structure after row 3 has been processed.

Figure 16:
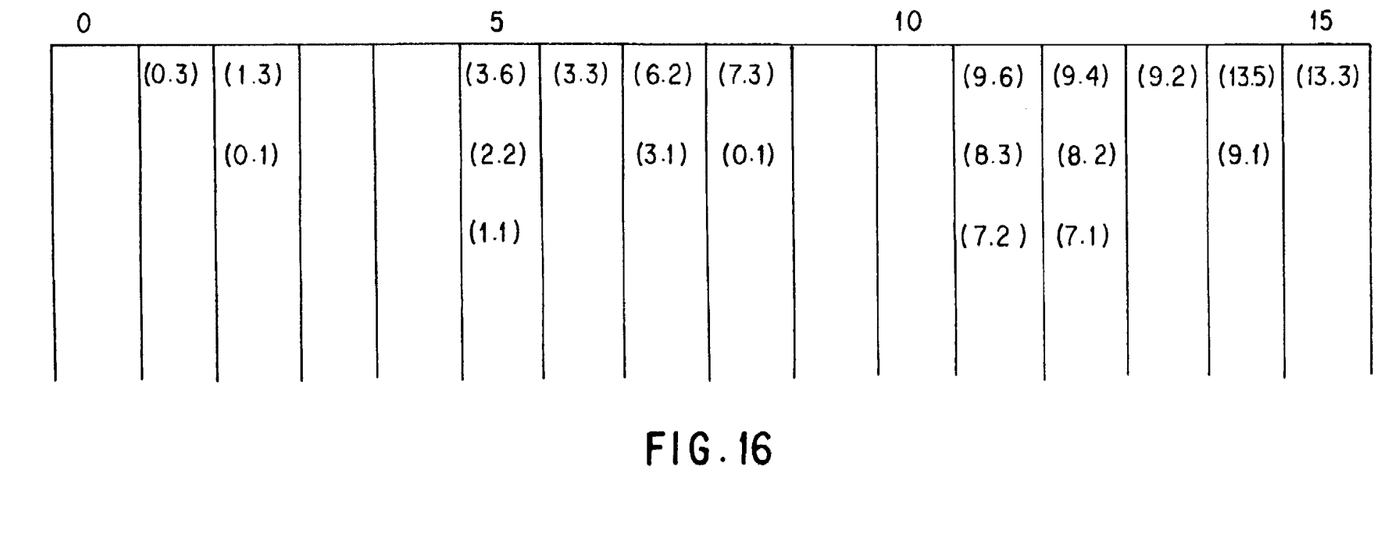

Rows 4–6 are processed in the same manner to form the final bin structure shown in FIG. 16. Notice that bin 5 has notation (3.6) and bin 11 has notation (9.6). Therefore, the highest ranking intervals have the rank of six. Thus, the column separating interval using this process is determined to be the intervals with the length of [3,5] and [9,11]. As can be seen in FIG. 9, this would be smallest interval between the columns which range from interval 0 to 3, 5 to 9 and 11 to 15.

If equalities are allowed while determining intersections using equation (1) and (2), the method can establish column separations of width zero. For example, the storage bin thirteen in FIG. 16 will have an element (13.6). This corresponds to a column separation of width zero between column locations 13 and 14 in FIG. 9.

A computer program does not "visualize" the current interval intersecting other intervals in the bin structure. Therefore, the method includes a way to eliminate processing bin intervals that do not intersect with the current interval.

For example, to find all the elements that intersect $I_7$ in FIG. 11, the left-end of interval $I_7$ is three. The processing to determine intersections with interval $I_7$ begins with bin three and continues with the bins to the right. Processing continues to the bin which contains the right-end of the right-most interval that intersects with interval $I_7$. For example, the right-most interval associated with interval $I_7$, which is located in bin 7, is interval $I_2$. The right-end of interval $I_2$ is twelve. Therefore, processing continues from bin 3 to bin 12.

A sample program which uses the method of the invention is shown below. Let $G_i$ be the closure of the first i intervals and $I_{i+1}$ be a new interval.

```
input: S,G_i, I_{i+1}
begin
    if I_{i+1} ∈ G_i => UNIQUE ← NILL;
    for each s ∈ S such that left(I_{i+1})≦s≦right-most
            (right(_{i+1}))
    begin
        for each g ∈ bin(s)
        begin
            if g ⊂ I_{i+1} => order(g) ← order(g) + 1; continue;
            if UNIQUE => let I_g ΔI_{i+1} ∩ g≠0
            if I_g ∉ G_i
                begin
```

-continued

```
        order (I) ← order (g) + 1;
        put I_g in G_i;
        if I_g = I_{i+1} => UNIQUE ← NILL;
      end
    end
  end
  if UNIQUE, order (I_{i+1}) ← 1; put I_{i+1} in G_i
end
```

This program is only a sample, other programs can be used to accomplish the steps of the invention.

Other variations to the preferred embodiments can be made. For example, the left-end addresses can be stored in the hash table. Therefore, searches would be done from right-to-left in the same manner as described above.

Another variation can occur when the tabular document is skewed. If the skewing of the columns is measured, then the previous preferred embodiments is modified by determining the bounding boxes and then deskewing only these bounding boxes. This method is preferable to processing the entire bitmap. The rest of the processing can be performed as previously described.

Although the invention has been described and illustrated with particularity, it is intended to be illustrative of preferred embodiments. It is understood that the disclosure has been made by way of example only. Numerous changes in the combination and arrangements of the parts, steps, and features can be made by those skilled in the art without departing from the spirit and scope of the invention, as hereinafter claimed.

What is claimed is:

1. A method locating columns in a tabular document comprising the steps of:
   determining space intervals between word fragments;
   intersecting the space intervals to form intersection intervals, the space intervals also intersecting with previously formed intersection intervals to form additional intersection intervals;
   ranking the space intervals and the intersection intervals according to a frequency of intersection between the space intervals and the intersection intervals; and
   selecting space intervals and intersection intervals based on the ranking.

2. The method of claim 1, wherein the word fragments are one of connected letters, numbers, symbols, pictures and graphics.

3. The method of claim 1, wherein the determining step is performed without decoding characters of the tabular document.

4. The method of claim 1, wherein the word fragments are represented as a single box by using a bounding box method.

5. The method of claim 1, wherein the space intervals are a white space between two adjacent word fragments.

6. The method of claim 1, wherein skewed columns in the tabular document are processed by first deskewing the word fragments.

7. The method of claim 1, wherein the intersection intervals and the space intervals are stored in a bin structure.

8. The method of claim 7, wherein a duplicate interval is eliminated from the bin structure and the rank of the duplicate interval remaining is increased by one.

9. The method of claim 7, wherein the ranking of intervals in the bin structure depend on how often an intersection between a specific interval and an interval in the bin structure results in a duplicate interval.

10. The method of claim 7, wherein the highest ranking bin intervals represent the location of the space between columns in the tabular document.

11. The method of claim 1, wherein the intersection intervals can have a zero width representing two adjacent columns without a space interval.

12. A method of locating columns in a tabular document comprising the steps of:
   (a) extracting a current interval located between image fragments;
   (b) intersecting the current interval with a bin structure interval to form intersection intervals, the bin structure interval being stored in a bin structure that contains previously extracted intervals and prior intersection intervals;
   (c) updating the bin structure to include the current interval and any new intersection intervals;
   (d) ranking the intervals in the bin structure according to a frequency of intersection between bin structure intervals;
   (e) repeating steps (a) through (d) until all of the intervals are extracted from the tabular document; and
   (f) selecting the intervals in the bin structure based on the ranking.

13. The method of claim 12, wherein word fragments are one of connected letters, numbers, symbols, pictures and graphics.

14. The method of claim 12, wherein the extracting step is performed without decoding characters of the tabular document.

15. The method of claim 12, wherein the extracting step is performed without decoding a bitmap of the tabular document.

16. The method of claim 12, wherein each word fragment is represented as a single box by using a bounding box method.

17. The method of claim 12, wherein the current interval is a white space between two adjacent word fragments.

18. The method of claim 12, wherein the extracting step further includes first deskewing the word fragments when the tabular document has skewed columns.

19. The method of claim 12, wherein the updating step increases the rank of a specific interval in the bin structure when the intersection of the current interval and a bin structure interval forms a duplicate of the specific interval.

20. The method of claim 12, wherein the ranking of intervals in the bin structure depend on how often an intersection between a specific interval and the bin structure interval results in a duplicate interval.

21. The method of claim 12, wherein the selecting step selects the intervals which represent the location of the space between columns in the tabular document.

22. The method of claim 12, wherein the bin structure groups each bin structure interval into a bin based on the right-end address of the bin structure interval.

23. The method of claim 22, wherein the bin structure intervals in each bin are stored based on the location of a left-end address of the bin structure interval.

24. The method of claim 22, wherein the intersecting step further comprises the steps of:
   locating a first bin having the address of the left-end address of the current interval;
   locating a last bin having a right-most interval in the bin structure, the right-most interval having both a left-end address at most equal to a right-end address of the current interval and a right-end address larger than any other interval; and
   intersecting the current interval with each interval contained in all the bins having an address between the address of an interval in the first bin and the address of an interval in the last bin.

25. The method of claim 12, wherein the intersection intervals can have a zero width representing two adjacent columns without a space interval.

26. An apparatus for locating columns in a tabular document comprising:

a coder for coding the tabular document into word fragments;

a computer for locating the columns in the tabular document, the computer including:

a determinator for determining space intervals between word fragments;

an intersector for intersecting the space intervals to form intersection intervals, the space intervals also intersecting with previously formed intersection intervals to form additional intersecting intervals;

a ranker for ranking the space intervals and the intersection intervals according to a frequency of intersection between the space intervals and the intersection intervals; and a selector for selecting space intervals and intersection intervals based on the ranking; and an output means for outputting the locations of the columns in the tabular document.

27. The apparatus of claim 26, wherein word fragments are one of connected letters, numbers, symbols, pictures and graphics.

28. The apparatus of claim 26, wherein the coder codes the tabular document into a bitmap and identifies the word fragments.

29. The apparatus of claim 26, wherein the coder forms bounding boxes around word fragments by using a bounding box method.

30. The apparatus of claim 26, wherein the output means is one of a printer and a monitor.

31. The apparatus of claim 26, wherein the space intervals are a white space between two adjacent word fragments.

32. The apparatus of claim 26, wherein the intersection intervals and the space intervals are stored in a bin structure.

33. The apparatus of claim 32, wherein the ranking of intervals in the bin structure depend on how often an intersection between a specific interval and an interval in the bin structure results in a duplicate interval.

34. The apparatus of claim 32, wherein the highest ranking bin intervals represent the location of the space between columns in the tabular document.

\* \* \* \* \*